United States Patent
Becker et al.

(10) Patent No.: US 9,199,336 B2
(45) Date of Patent: Dec. 1, 2015

(54) METHOD FOR ALLOCATION OF ONE OR MORE PIPES WITH SEVERAL PIPE PARTS TO BE CUT

(75) Inventors: Michael Becker, Geraberg (DE); Rainer Schlegel, Albstadt (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 527 days.

(21) Appl. No.: 12/893,676

(22) Filed: Sep. 29, 2010

(65) Prior Publication Data
US 2011/0060444 A1 Mar. 10, 2011

Related U.S. Application Data

(63) Continuation of application No. PCT/DE2009/000412, filed on Mar. 31, 2009.

(30) Foreign Application Priority Data

Mar. 31, 2008 (DE) .................. 10 2008 016 734

(51) Int. Cl.
*B23K 26/38* (2014.01)

(52) U.S. Cl.
CPC ...................... *B23K 26/38* (2013.01)

(58) Field of Classification Search
CPC ..... G06Q 10/043; G06Q 10/06; B23K 26/38; B26D 5/00
USPC .......................... 700/105, 106, 166, 173, 171
See application file for complete search history.

(56) References Cited

U.S. PATENT DOCUMENTS

| | | | |
|---|---|---|---|
| 4,534,002 A * | 8/1985 | Urban | 700/171 |
| 5,662,566 A | 9/1997 | Marxrieser et al. | |
| 5,970,830 A | 10/1999 | von Niederhausern | |
| 6,522,941 B1 * | 2/2003 | Tashiro et al. | 700/180 |
| 6,690,990 B1 * | 2/2004 | Caron et al. | 700/171 |
| 2002/0072824 A1 | 6/2002 | Susnjara | |

(Continued)

FOREIGN PATENT DOCUMENTS

| | | |
|---|---|---|
| CN | 1357428 A | 7/2002 |
| EP | 0871100 A2 | 10/1998 |

(Continued)

OTHER PUBLICATIONS

Office Action from corresponding Korean Application No. 10-2010-7023725, mailed Jul. 19, 2012, 8 pages.

(Continued)

*Primary Examiner* — Mohammad Ali
*Assistant Examiner* — Nathan L Laughlin
(74) *Attorney, Agent, or Firm* — Fish & Richardson P.C.

(57) ABSTRACT

The invention relates to a method for allocation of a pipe or several pipes with several pipe parts to be cut for a laser cutting installation, wherein the pipe parts to be cut are selected from an order table. Methods include measuring a length of each of the one or more pipes, calculating, before measuring, a nesting of a pipe part relative to the same pipe part or a different pipe part of the order table, calculating a plurality of pipe allocation variants for a particular pipe of the one or more pipes with the pipe parts to be cut based on the nesting and the measured pipe length of the particular pipe, selecting one of the plurality of calculated pipe allocation variants as a desired pipe allocation, and initiating cutting of the particular pipe based on the desired pipe allocation.

18 Claims, 8 Drawing Sheets

(56) References Cited

U.S. PATENT DOCUMENTS

| | | | |
|---|---|---|---|
| 2002/0103557 A1* | 8/2002 | Land | 700/96 |
| 2005/0129348 A1* | 6/2005 | Iwasaki | 385/14 |
| 2007/0270996 A1* | 11/2007 | Roise | 700/171 |
| 2008/0016696 A1 | 1/2008 | Marple et al. | |

FOREIGN PATENT DOCUMENTS

| | | | |
|---|---|---|---|
| EP | 1366846 | A1 | 12/2003 |
| EP | 1516696 | A1 | 3/2005 |
| JP | 9128028 | | 5/1997 |
| JP | 11320145 | A | 11/1999 |
| WO | 02072304 | A2 | 9/2002 |

OTHER PUBLICATIONS

Trumpf: The New TruTops Versions, internet: http://web.archive.org/web/2007080808136/http://www.trumpf.com/1.software_trutops_neue_oberflaeche_detail.html, Jun. 26, 2007, 6 pages.

Written Opinion and International Search Report from corresponding PCT Application PCT/DE2009/00412, dated Sep. 2, 2009, with English translation, 8 pages.

Office Action from corresponding German Application No. 10 2008 016 734.7, dated Mar. 27, 2009, with English translation, 9 pages.

\* cited by examiner

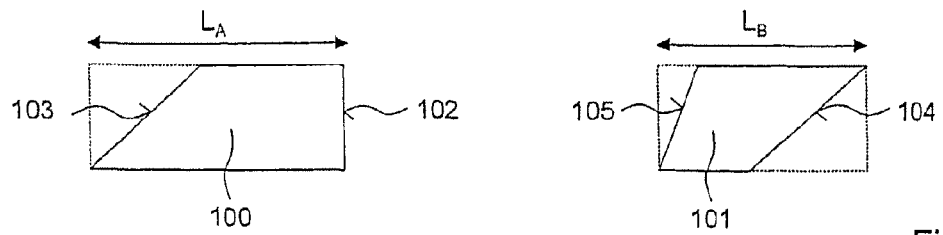
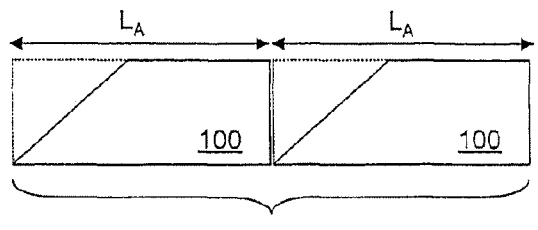
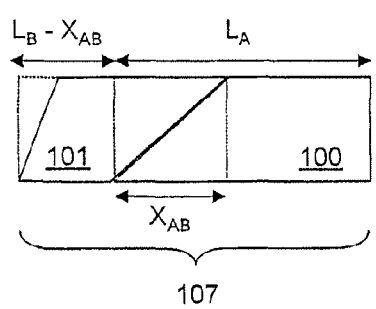
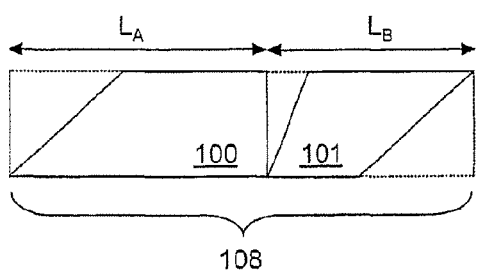
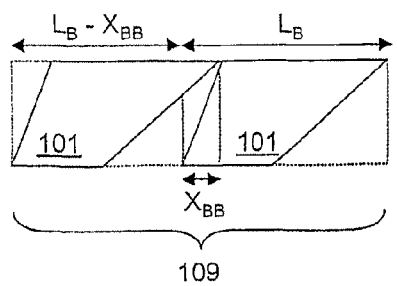
Fig. 6a
Fig. 6b

METHOD FOR ALLOCATION OF ONE OR MORE PIPES WITH SEVERAL PIPE PARTS TO BE CUT

CROSS-REFERENCE TO RELATED APPLICATIONS

This application is a continuation of and claims priority under 35 U.S.C. §120 to PCT/DE2009/000412, filed on Mar. 31, 2009, and designating the U.S., which claims priority under 35 U.S.C. §119 to German Patent Application No. 10 2008 016 734.7, filed on Mar. 31, 2008. The contents of the prior applications are hereby incorporated by reference in their entireties.

TECHNICAL FIELD

The present invention relates to a method for the allocation of a pipe or several pipes with several pipe parts to be cut for a processing machine, in particular for a laser cutting machine, wherein the pipe parts to be cut are selected from an order table, and also to a computer program product that is adjusted for performing the method.

BACKGROUND

Within the scope of the present application, a tube is defined as an elongated element the length of which is generally substantially larger than its cross-section and which is produced from a substantially inflexible material. Pipes can have any open or closed cross-sectional shape, wherein round and rectangular pipes are the most common pipes. Pipe-shaped elements that are produced from pipes by laser cutting are designated as pipe parts within the scope of the present application.

FIG. 1 shows a processing machine 1 for laser cutting of pipes 2 known as "TruLaser Tube," which is designated as a laser cutting machine and is designed for processing pipes having any cross-sectional shape. The illustrated laser cutting machine 1 comprises a supply device 3 for lateral supply of a pipe 2 to be cut to the laser cutting machine 1, a processing device 4 for laser cutting of pipe parts from the pipe 2 and a discharge device 5 for discharging the cut pipe parts out of the laser cutting machine 1. All essential functions of the laser cutting machine 1 are controlled by means of a numerical control device 6.

The supply device 3 comprises a rotating and feeding means 7 that serves as workpiece moving means, and a machine bed 8 with guiding rails 9 and a push-through means 10. The rotating and feeding means 7 is driven by a motor and can be moved in the feed direction 11 on the guiding rails 9. On the side facing a pipe 2 to be fed, the rotating and feeding means 7 has a clamping means 12 that is controlled to be rotatable in the direction of an axis of rotation 13 and surrounds the supplied pipe 2 from the outside to stationarily clamp it. The supplied pipe 2 is supported by a workpiece support 14 integrated in the machine bed 8. The pipe 2 is guided through the push-through means 10 in the area of the processing device 4. The push-through means 10 is designed in such a fashion that the clamped pipe 2 is guided in the feed direction 11 and is not stationarily clamped. The pipe 2 can be rotated about the axis of rotation 13 in the push-through means 10.

The processing device 4 comprises a laser beam source 15 for generating a laser beam 16, a processing head 17 and a beam guidance 18 that guides the laser beam 16 from the laser beam source 15 to the processing head 17. The laser beam 16 exits the processing head 17 and is focused on the outer peripheral surface of the clamped pipe 2. The discharge device 5 is provided on the side of the push-through means 10 facing away from the machine bed 8, and discharges the pipe parts cut from the pipe 2 and the residual pipe out of the laser cutting machine 1.

In order to increase the productivity of the laser cutting machine 1, the laser cutting machine 1 of FIG. 1 has a loading device 19 as automation component with which a pipe 2 is automatically transported into a transfer position 86 (FIG. 3) and transferred to the supply device 3 of the laser cutting machine 1. The machine arrangement of laser cutting machine 1 and loading device 19 is called flexible manufacturing cell 20 (abbreviated as FMC).

When the pipe 2 supplied via the loading device 19 is located in the transfer position 86, the rotating and feeding means 7 is initially in an initial position remote from the processing head. For processing a pipe, the rotating and feeding means 7 moves out of its position with opened clamping means 12 towards the supplied pipe 2 until the end of the pipe 2 facing away from the processing head 17 comes to rest within the clamping means 12. The clamping means 12 is closed and the pipe 2 is thereby stationarily clamped on the rotating and feeding means 7. The rotating and feeding means 7 and the pipe 2 move together towards the processing head 17. The end of the pipe 2 facing the processing head 17 thereby initially enters the push-through means 10 and is moved in the feed direction 11 through the push-through means 10, wherein the pipe 2 can be rotated about the axis of rotation 13 in the push-through means 10. The pipe 2 is delivered to the desired processing position 92 relative to the processing head 17 through movement of the rotating and feeding means 7 in the feed direction 11.

Processing machines are controlled by means of numerical controls that are also called NC controls, wherein NC is the abbreviation of the English term "Numerical Control." Since the early 1970s, permanently wired NC controls have been replaced by computer-controlled NC controls that are called CNC controls (Computerized Numerical Control). Modern NC controls are exclusively based on microprocessor technology, for which reason the terms NC control and CNC control are practically used synonymously. One advantage of NC controls on the basis of microprocessor technology is that uniform hardware components that are available in large quantities can be adjusted to special processing machines and production tasks by implementing different software components. The current state of modern NC controls is provided e.g. in the textbook by Manfred Weck, Werkzeugmaschinen Fertigungssysteme, volume 4 "Automatisierung von Maschinen and Anlagen" (automation of machines and systems), Springer-Verlag.

NC controls are generally divided into three control units:
MMC control unit (Man Machine Communication) as data input and visualization unit,
adjustment control unit as central control unit that is also referred to as SPS or PLC, wherein SPS is the abbreviation of the term "memory programmable control," in English Programmable Logic Controller, abbreviated as PLC,
NC control unit.

Data or control commands input via the MMC control unit are decoded in the NC control unit, separated and further processed in accordance with geometrical data, technological data and switching functions. Geometrical data contains e.g. path information about the paths on which the tools and workpieces must be moved (processing head and pipe movement), whereas technological data contains e.g. processing parameters such as feed speed and laser beam power. Switching commands control e.g. tool change, feeding of parts (load pipe) and removing parts (unload pipe part). Switching commands are passed on to the SPS control unit where they are linked with responses from the processing machine and are transformed into control commands for the units to be switched in accordance with the gradually processed control program. The geometrical and technological data generates corresponding commands of axis movement for the processing machine upon request by the NC control unit. The NC and SPS control units transmit the current status of the machine to the MMC control unit for visualization.

The three control units, MMC, SPS and NC control unit were realized in the form of separate processors (multi-processor technology) in the past due to limited processor power. Modern processors are so efficient that even one single processor (so-called single-processor technology) can provide the required power. With NC controls with single-processor technology, the MMC, SPS and NC control units are only separated at the software level today.

For controlling a processing machine, the NC control requires a suitable control program that is also called NC program. Each command to a processing machine is expressed in the form of so-called functions encoded in a DIN code. Basic functions that are used for each processing method are stated in international guidelines, in particular in the DIN standard 66025. The basic functions include movement information to a defined position, geometrical information describing the contour profile of a part (sheet metal part, pipe part) and technological information for the production of the contour (e.g. laser cutting). In addition to the basic functions that are defined in the DIN code, the machine manufacturers develop special NC functions for their processing machines and the associated processing methods. For laser cutting of pipes, the different wall thicknesses require e.g. different piercing methods that can each be accessed via their own NC functions.

For automatic generation of NC programs, machine manufacturers and software companies developed so-called programming systems. Programming systems know the basic and special NC functions and know which technology data is required and which processing rules are applied.

In this way, they can automatically define the processing and generate an NC program. Special NC functions are stored and documented in the programming system such that a programmer can use an NC function without knowing its DIN code. Nowadays, a programmer does not need any classical programming knowledge, his/her expert knowledge rather includes finding the optimum processing parameters and processing strategies.

FIG. 2 shows the numerical control device 6 of the laser cutting machine 1 of FIG. 1 that comprises all hardware and software components that are used to control the laser cutting machine 1 and the manufacturing cell 20.

On the hardware side, the control device 6 comprises an MMC control unit 30 with a control computer 31 that is e.g. designed as an industrial PC, and an operating means 32 having a screen 33 as display unit, and a keyboard 34 as input unit, as well as a machine control panel 35 for manual operation of the laser cutting machine 1 and of the manufacturing cell 20, and an NCU assembly 36 (Numerical Control Unit) with integrated NC control unit 37 and SPS control unit 38. All hardware components of the control device 6 are networked via a bus system (not shown) to which further control components can be connected. The MMC control unit 30 and the NCU assembly 36 with NC and SPS control units 37, 38 are designed in the form of two separate components in this embodiment. In an alternative fashion, the MMC, NC and SPS control units 30, 37, 38 can be designed in the form of three separate components or as one common processor for single-processor technology. The control computer 31 and the NCU assembly 36 can be disposed in a switch cabinet (not shown) associated with the laser cutting machine 1.

On the software side, the control device 6 comprises operating software for controlling the automation components (loading device 19) as well as software modules for job management, tool management and pallet management that are combined as operating software 39 for the manufacturing cell (manufacturing cell operating software, FMC software). Operating software 40 for the laser cutting machine (machine operating software, MMC software), program management 41 for managing the NC programs and, if necessary, further applications such as e.g. a programming system 42 are installed on the control computer 31 in addition to the FMC software 39 for the manufacturing cell.

In order to be able to create an NC program that is called NC parts program in a programming system for a pipe part to be cut, the programmer requires a design drawing of the pipe part that is loaded into the programming system. A pipe part is constructed by means of a construction system 43 (CAD system) or a combined construction and programming system 44 (CAD/CAM system), wherein the abbreviations CAD and CAM stand for Computer Aided Design and Computer Aided Manufacturing. The finished design drawings are stored in a common CAD data storage 46 provided for this purpose in a network 45, which the programmers can access when required.

An NC parts program for laser cutting of a pipe part can be created in two different ways. In the first case, the NC parts program is created during work preparation by means of a programming system and transferred to the control device 6. Previously read-in NC parts programs can be subsequently changed or corrected via the operating means 32. In the second case, the machine operator manually creates the NC parts program on the operating means 32 of the MMC control unit 30. In the embodiment shown in FIG. 2, in addition to the programming system 42, further programming systems are installed in the network 45 on the control computer 31 in the form of a combined construction and programming system 44 (CAD-/CAM system) and a pure programming system 47 (CAM system). The control computer 31 and the programming systems 42, 44, 47 are connected to a CAM data storage 48 that the programmers and machine operators can access. The programmer stores the finished NC parts programs in the CAM data storage 48. The machine operator can access the CAM data storage 48 and import the NC parts programs from the CAM data storage 48 into the program management 41 of the control computer 31. The data transfer of the NC parts programs into the program management 41 can also be realized via a storage medium such as a CD ROM or a USB stick such that it is also possible to import NC parts programs that are not stored in the CAM data storage 48 into the program management 41.

For producing a pipe part on the laser cutting machine 1, the machine operator generates an order table 49, schematically indicated in FIG. 1, in the FMC software 39, in which table a parts order 49a, 49b is created for each pipe part stating the quantity of pipe parts in addition to the program name of the associated NC parts program. During creation, the parts orders 49a, 49b are associated with a status "blocked" or "approved." Only approved parts orders, i.e. parts orders that have the status "approved" are processed on the laser cutting machine 1. Blocked parts orders, i.e. parts orders that have the status "blocked" cannot be processed and are therefore not taken into consideration in automatic pipe allocation. The FMC software 39 shows the status "active" in the order table 49 when an approved parts order is being processed on the laser cutting machine 1. A parts order that was duly processed shows the status "finished" in the order table 49.

FIG. 3 shows the loading device 19 of the laser cutting machine 1 of FIG. 1. The loading device 19 comprises a bundling recess 80 for receiving pipes 2, a separating means 81 for separating the pipes 2 from the bundle recess 80, a lifting means 82 for lifting a separated pipe and a transfer means 83 with grippers 84 for transferring the pipe 2 to the supply device 3 of the laser cutting machine 1. Since the pipes can differ in length by up to a few centimeters, the loading device 19 moreover includes a measuring means 85 for measuring the length of the pipes. The length must be measured to determine the X position (position in the feed direction 11) of the transfer position 86 of the pipe to the rotating and feeding means 7.

During processing of a pipe on the laser cutting machine 1 or during unloading of the residual pipe, the loading process of the next pipe is prepared. The process "prepare loading" includes the method steps to move a pipe 2 out of the bundle recess 80 via a measuring position 87 into a waiting position 88. The pipes are fed and measured during machining until the waiting position 88 is reached.

Several pipes 2 that are provided for processing on the laser cutting machine 1 are located in the bundle recess 80. The pipes 2 are automatically transferred from the bundle recess 80 to the separating means 81. The separating means 81 of the present embodiment has a first transport section as an accumulation section 89 and a second transport section as a separation section 90. The accumulation section 89 and the separation section 90 consist of motor-driven conveyor chains that extend parallel to each other and cross each other. The pipes 2 disposed on the accumulation section 89 are transferred to the separation section 90. The pipes 2 are pulled apart and thereby separated by increasing the transport speed of the separation section 90 with respect to the accumulation section 89.

The lifting means 82 is provided at the end of the separation section 90 for lifting one single pipe 2 into the measuring position 87 in which the length of the pipe 2 is measured using the measuring means 85. The measurement of the length is performed automatically through movement of a toothed belt drive, provided with a pressure sensor, against an electrically detected switch. The measured value of the pipe length is transferred by the measuring means 85 to the control device 6 of the laser cutting machine 1. The grippers 84 of the transfer means 83 move from a basic position 91 to the measuring position 87, take over the pipe 2 after its length has been measured and move together with the pipe 2 to the waiting position 88 in which they remain until the loading process is approved. As soon as the grippers 84 with the pipe 2 are arranged in the waiting position 88, the process "prepare loading" is terminated.

After approval of the loading process, the grippers 84 move into the transfer position 86 in which the measured pipe is transferred by the grippers 84 to the rotating and feeding means 7. When the pipe 2 is in the transfer position 86, it is clamped by the clamping means 12 of the approaching rotating and feeding means 7. The grippers 84 return to their basic position 91. The loading process is terminated and the message "pipe loading terminated" appears on the screen 33 of the MMC control unit 30.

In the conventional laser cutting machine 1 of FIG. 1, the pipe allocation with several pipe parts to be cut is either created in the associated programming system 42, 44, 47 or in the FMC software 39 of the control computer 31.

The programming system "TruToPs Tube" used by the conventional laser cutting machine "TruLaser Tube" 1 optionally comprises a nesting module "TubeLink" for optimizing the allocation of a pipe with several pipe parts to be cut. FIG. 4 shows a flow chart of the individual method steps of the method known from TubeLink for optimizing the pipe allocation. In a first step S1, the programmer determines the nesting options, wherein he/she specifies the minimum pipe length of the pipes to be cut, the distance between the pipe parts and the length of the pipe piece that cannot be processed in the dead area of the clamping means 12 as "minimum residual length." In a second step S2, the programmer creates a new production package or opens an existing one and includes the NC parts programs of the pipe parts to be nested in the opened production package in a third step S3. In a fourth step S4, it is checked whether the production package contains all desired NC parts programs. When the result of the test of step S4 is negative (N), the method is continued with step S3 and a further NC parts program is included in the production package. When the result of the test of step S4 is positive (J), it is examined in a fifth step S5 whether the NC parts programs and therefore the pipe parts are arranged in the desired order. The pipe parts to be nested are disposed on the pipe in the same sequence as recorded in the production package. When the result of the test of step S5 is negative (N), the programmer changes in a sixth step S6 the order of the pipe parts in the production package through re-sorting of the NC parts programs. When the result of the test of FIG. 5 is positive (J) or after step S6, nesting of the pipe part with respect to the previous pipe part is calculated in a seventh step S7. Nesting is defined by displacement of the pipe part in the feed direction 11 (X-offset) and rotation about the axis of rotation 13 (A-offset). In an eighth step S8, it is checked whether the pipe part shall be produced in a quantity larger than 1. When the result of the test of step S8 is positive (J), nesting of the pipe part with respect to the same pipe part is calculated in a ninth step S9. When the result of the test of step S8 is negative (N) or subsequent to step S9, all nesting results from step S7 and, if necessary, of step S9 are stored in a tenth step S10. In an eleventh step S11, it is checked whether a further pipe part is arranged behind the present pipe part. When the result of the test of step S11 is positive (J), the method is continued with step S7 and nesting of the further pipe part with respect to the previous pipe part is calculated. When the result of the test of step S11 is negative (N), the production package is stored as complete pipe allocation in a twelfth step S12. After step S12, the conventional method for optimizing the pipe allocation is terminated.

In an alternative fashion, the pipe allocation of the conventional laser cutting machine "TruLaser Tube" 1 is performed after creating an order table 49 by means of the FMC software 39. The order in which the pipe parts to be cut are arranged on the pipe is determined by one of four allocation types: "fixed allocation," "endless processing," "endless processing with filler part" and "longest pipe part at first," wherein pipe orders for the allocation type "fixed allocation" are manually created by the machine operator and for the other allocation types they are automatically created by the FMC software 39. For the allocation type "fixed allocation," NC parts programs or pipe parts are manually moved from the program management 41 to the pipe and created as a pipe order and stored. The pipe order is successively processed until the stated quantity of pipe parts has been reached. This type of allocation is mainly suited to produce pipe parts in assemblies. For the allocation type "endless processing," all parts orders with the status "approved" are used in accordance with their sequence numbers for automatic pipe allocation, and are disposed one after the other on the pipe. Parts orders with the status "blocked" are blocked for pipe allocation and are not taken into consideration in automatic pipe allocation. As soon as the overall length of the pipe has been exceeded, the last pipe part is removed and the sequence of the pipe parts is stored in the form of a pipe order. The number of pipe orders that are created corresponds to the number that is required in order to process all parts orders with the status "approved." For the allocation type "endless processing with filler part," the pipe allocation is initially performed analogously to "endless processing." In order to improve the utilization of the pipe, the parts orders are searched for short pipe parts. These short pipe parts are moved as filler parts into the still usable areas on the pipe that are generated as residual pipes in the allocation type "endless processing" when the parts orders are moved to the pipe exclusively in accordance with their sequence numbers. For the allocation type "longest pipe part at first," all parts orders with the status "approved" that are sorted according to the pipe part length are used for automatic pipe allocation. The pipe allocation starts with the longest pipe part arranged next to one another until the required quantity has been achieved or the overall length of the pipe has been exceeded. When the quantity of longest pipe parts has been reached, the next shorter pipe part is disposed on the pipe until the required quantity has been achieved or the overall length of the pipe has been exceeded.

The conventional nesting module "TubeLink" optimizes nesting of two pipe parts disposed next to one another on the pipe. With each of the four types of allocation, the pipe parts are arranged in accordance with the so-called rectangular allocation, wherein the pipe parts are shown as rectangles in the unrolling state, wherein the sides of the rectangle are determined by the outer points of the initial and final geometries.

SUMMARY

In contrast thereto, the present invention provides an improved method for the allocation of a pipe or several pipes with several pipe parts to be cut, thereby taking into consideration the actual pipe length.

In accordance with one aspect of the invention, the pipe or the pipes are measured, nesting of the pipe part with respect to the same pipe part and/or to one or more different pipe parts of the order table is calculated for one or more pipe parts of the order table prior to measuring the length of the pipe or pipes, and after measurement of the length of the pipe or pipes, different pipe allocation variants with the pipe parts to be cut are calculated taking into consideration the previously calculated nestings and measured pipe length, and one of the calculated pipe allocation variants is selected as the desired, or "best pipe allocation." The pipe allocation variant that has the largest sum of pipe parts (number of pipe parts) is preferably selected as the "best pipe allocation" from all calculated pipe allocation variants. The pipe allocation variant having the smallest occupied pipe length is preferably selected as the desired, or "best pipe allocation" from several calculated pipe allocation variants having the same largest sum of pipe parts, so that the residual pipe length is preferably maximum for further processing. The pipe is cut based on the desired pipe allocation.

When two pipe parts are nested, the possible rotation and/or displacement of one pipe part relative to the other pipe part are calculated. Whether and to which extent a pipe part can be rotated and/or displaced is determined by the programmer via the properties "rotatable about A-offset" and "displaceable about X-offset" when the NC parts program is created. The property "tiltable or mirrorable" states whether a pipe part can be horizontally tilted. For a tilted pipe part, the initial and final geometries are interchanged compared to the non-tilted pipe part and rotated through 180° about the axis of rotation 13. For calculating nesting with respect to a tiltable pipe part, the possible rotation and displacement is calculated both with respect to the non-tilted and to the tilted pipe part.

In accordance with the invention, the actual pipe length of a pipe or several pipes is taken into consideration for optimizing the pipe allocation and for determining the sequence of the pipe parts.

Nesting is preferably calculated for each pipe part of the order table with an approved parts order. Nesting is calculated, in particular, with respect to the same pipe part and to all different pipe parts of the order table with an approved parts order and, if necessary, with respect to all different pipe parts of the order table with a blocked parts order.

The calculation of the pipe allocation variants is advantageously started as soon as the measured pipe length has been transferred to a control device of the laser cutting machine.

The calculation of different pipe allocation variants is advantageously terminated as soon as the pipe has been disposed in a transfer position and has been transferred to a supply device of the laser cutting machine or as soon as a preset time has elapsed or as soon as the pipe has been disposed in a processing position.

The invention also relates to a computer program product including code means that are adjusted to perform all steps of the above-described optimization method when the program is run on a data processing system.

Further advantages of the invention can be extracted from the claims, the description and the drawing. The features mentioned above and below can be used individually or collectively in arbitrary combination. The embodiments shown and described are not to be understood as exhaustive enumeration but have exemplary character for describing the invention.

DESCRIPTION OF DRAWINGS

FIGS. 6a-d show the performance of the preparatory calculation (FIG. 6b) in accordance with the invention with the example of two pipe parts of different length (FIG. 6a) and the determination of the "best allocation" of a pipe (FIGS. 6c, d).

DETAILED DESCRIPTION

Figure 1:
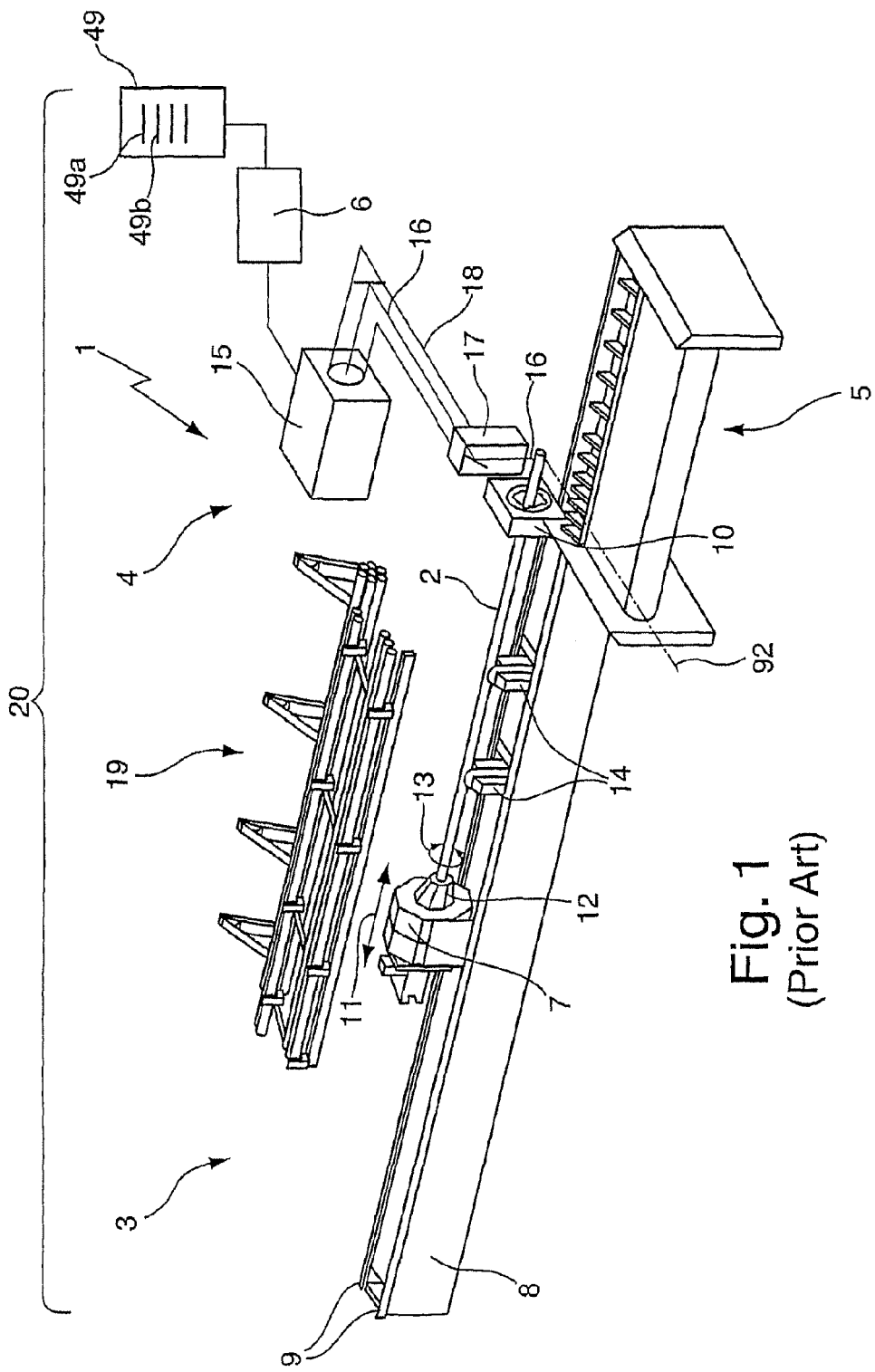
FIG. 1 shows a conventional laser cutting machine for cutting pipes.
Figure 2:
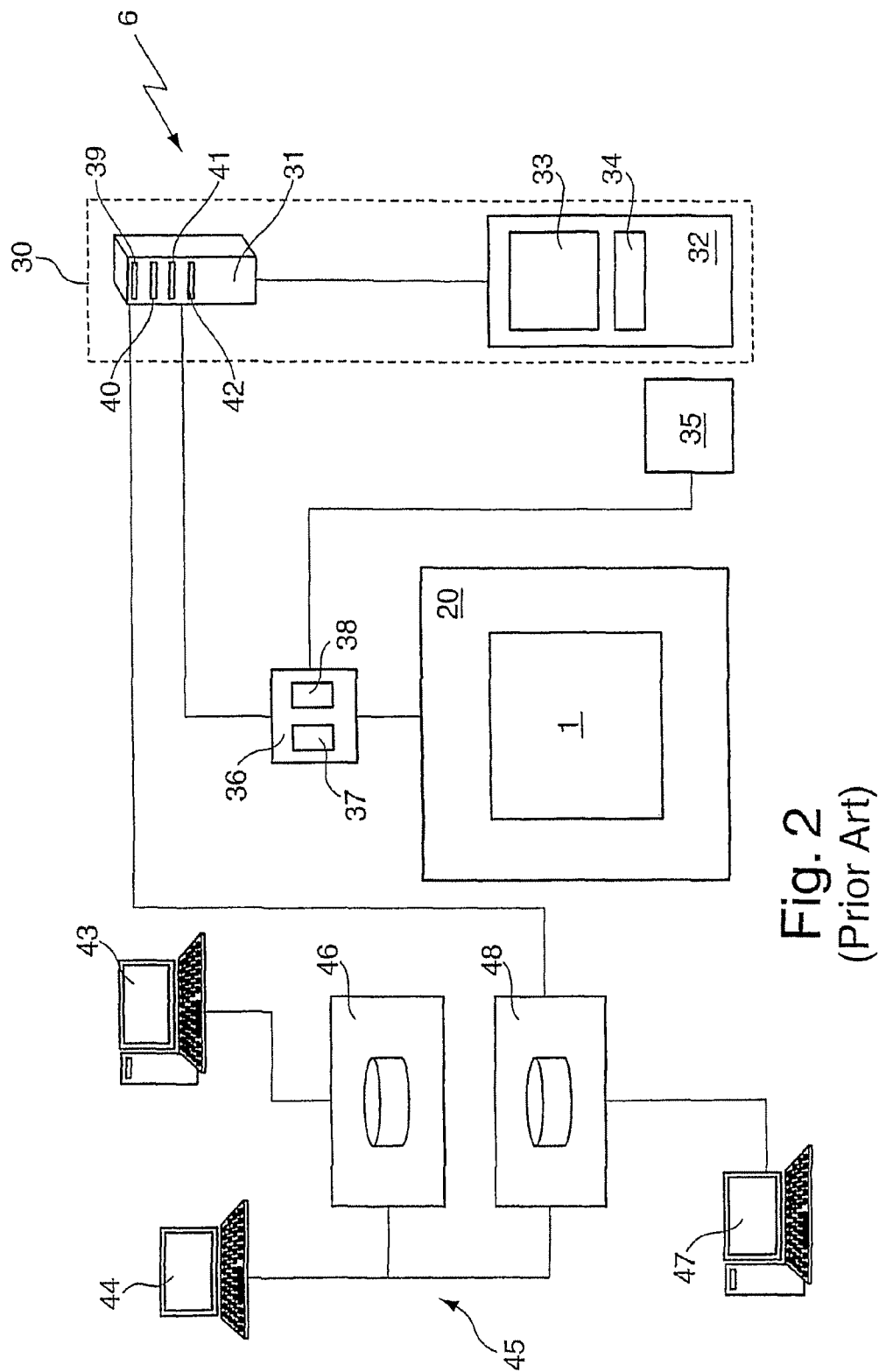
FIG. 2 shows the numerical control device of the conventional laser cutting machine shown in FIG. 1.
Figure 3:
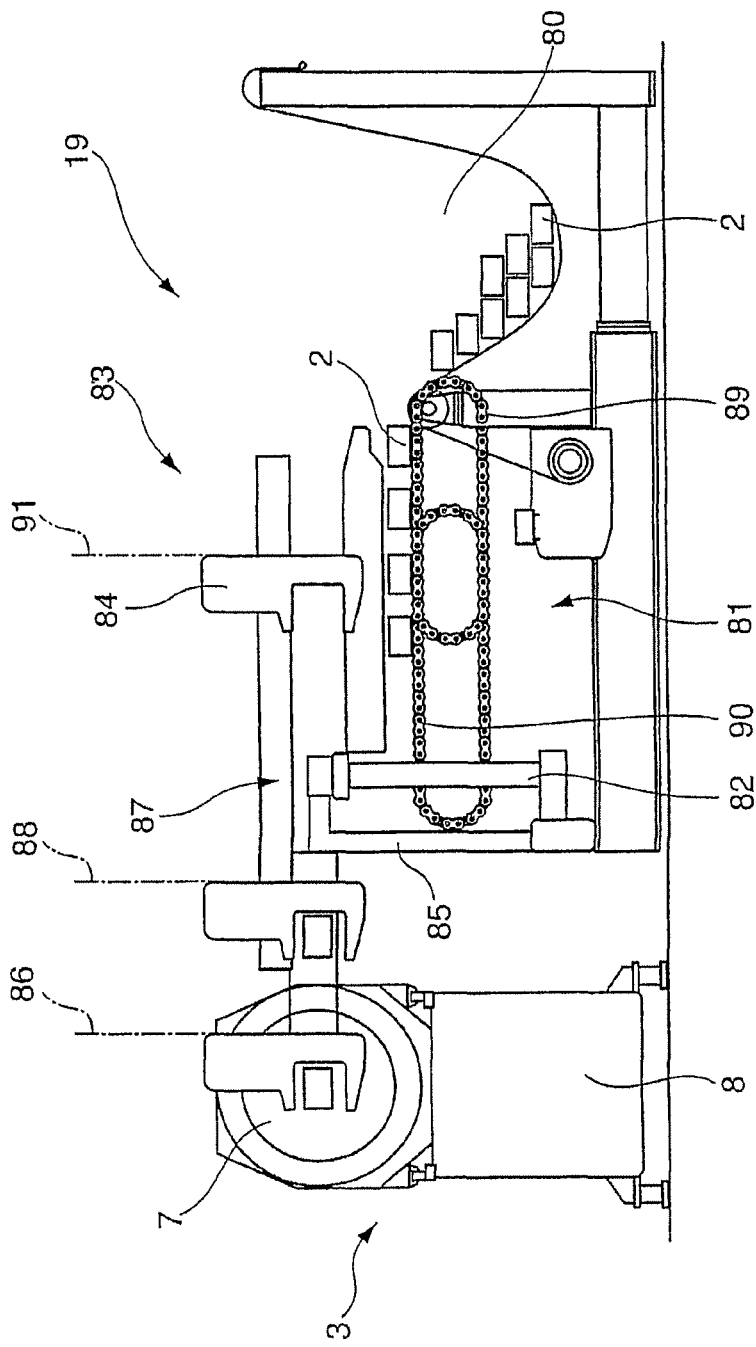
FIG. 3 shows the loading device of the conventional laser cutting machine shown in FIG. 1.
Figure 4:
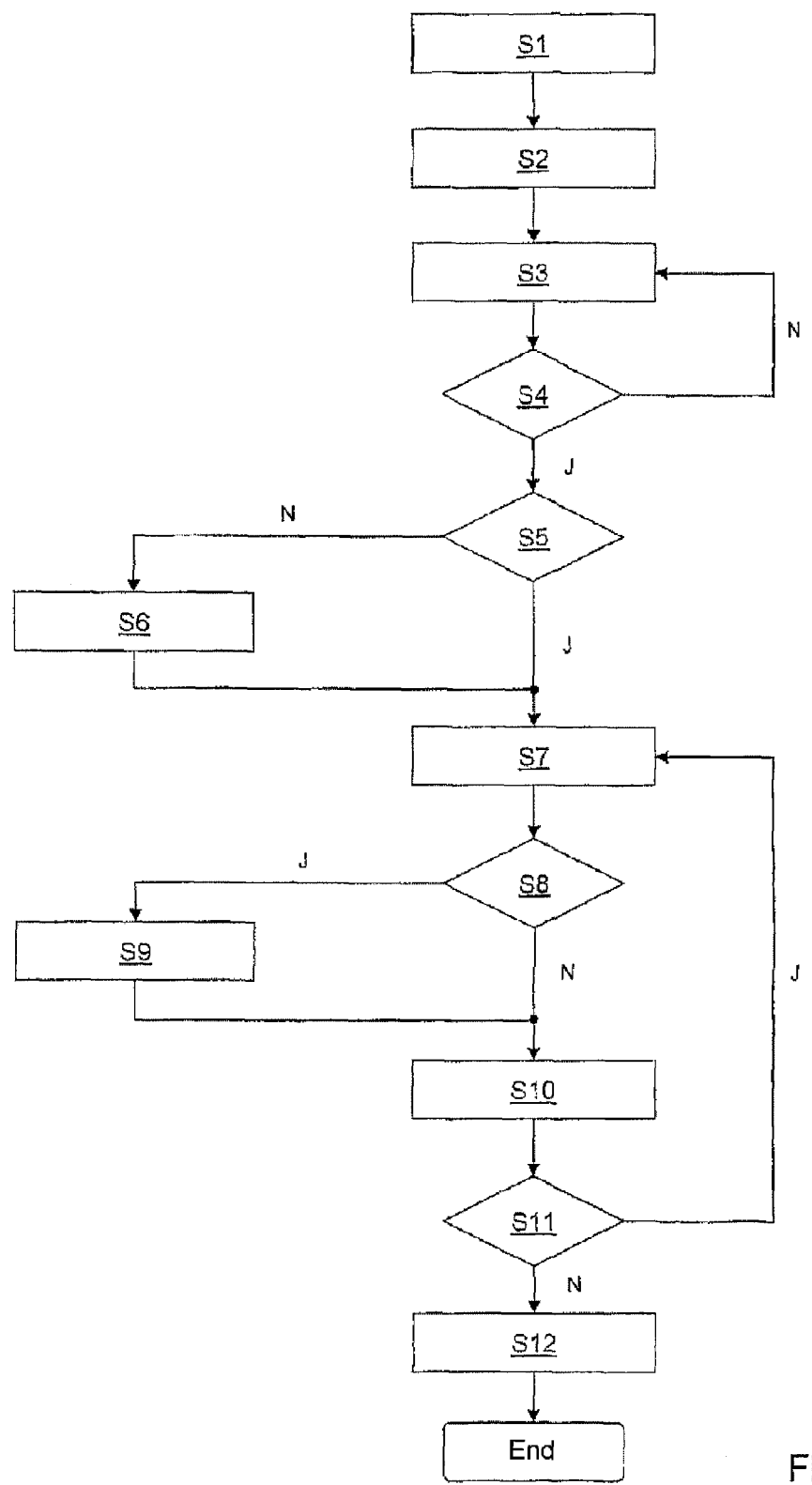
FIG. 4 shows a flow chart of the individual steps of the conventional method for optimizing the allocation of a pipe with several pipe parts to be cut.
Figure 5:
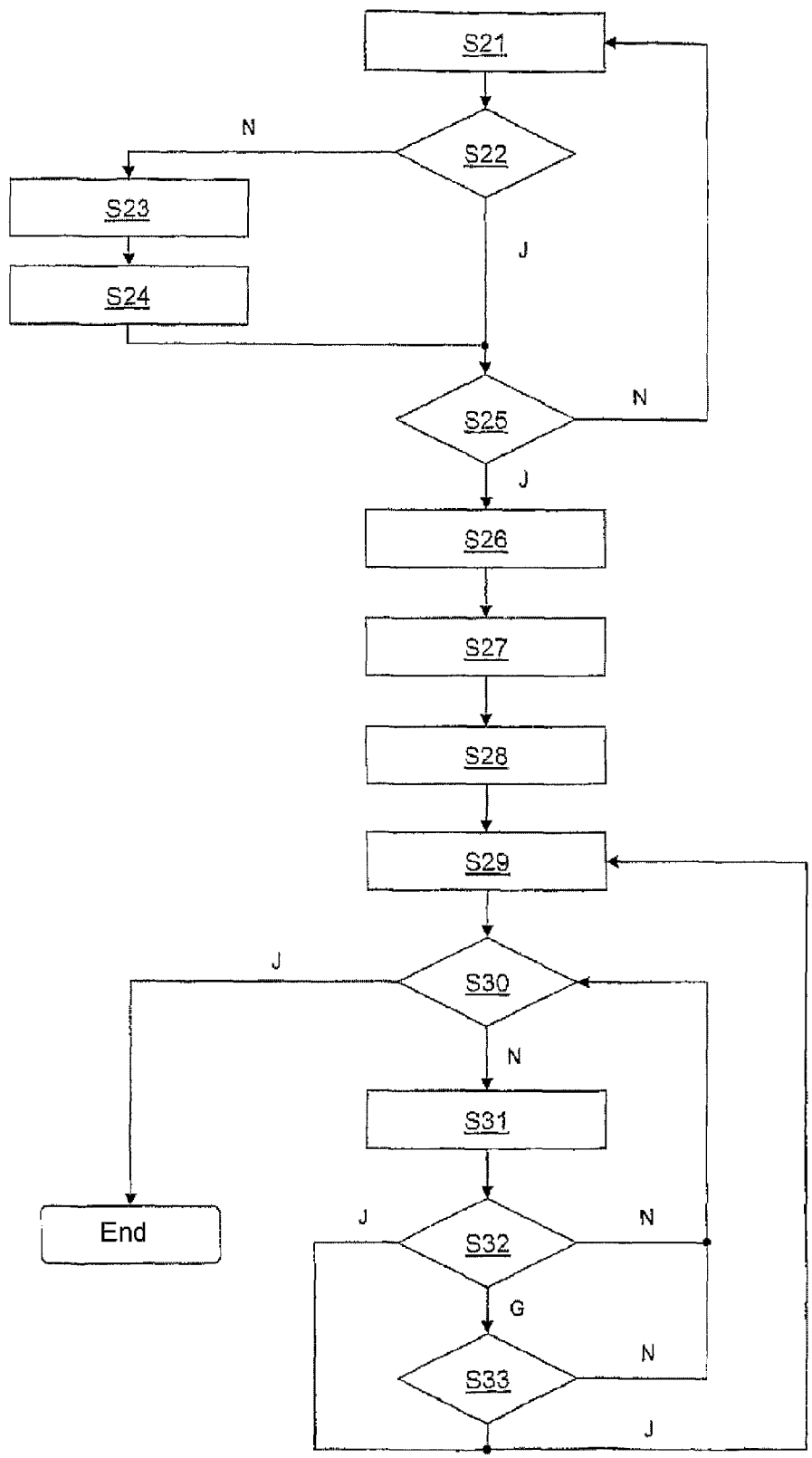
FIG. 5 shows a flow chart of the individual steps of the inventive method for optimizing the allocation of a pipe with several pipe parts to be cut.

FIG. 5 shows the individual method steps S21 to S33 of a method for optimizing the allocation of a pipe with several pipe parts to be cut in the form of a flow chart. The method includes a first process stage with steps S21 to S25, measurement of the length of the pipe (steps S26 and S27) and a second process stage with steps S28 to S33. The first process stage is performed prior to measurement of the length and the second process stage is performed after the measurement of the length of the pipe.

In a first step S21, a parts order for a pipe part to be cut is created and approved in the order table 49 of the FMC software 39, wherein the parts order also states the quantity of the pipe parts to be cut in addition to the program name of the associated NC parts program. When the NC parts programs of the pipe part that are required for creating a parts order are not contained in the program management 41 of the control computer 31, the NC parts programs are imported into the program management 41 when the parts order is created. In a second step S22, it is checked whether nesting of this pipe part with respect to the other pipe parts of the order table with the status "approved" and with respect to the same pipe part was performed and whether the nesting results are already present. When two pipe parts are nested, any possible rotation (A-offset) and/or displacement (X-offset) of one pipe part relative to the other pipe part is calculated. Whether and to what extent a pipe part can be rotated and/or displaced is determined by the programmer via the properties "rotatable about A-offset" and "displaceable about X-offset" while creating the NC parts program. The rotatability is important e.g. for pipes having a weld seam in the longitudinal direction. When the longitudinal seam of all cut pipe parts shall have the same orientation, the pipe parts must not be rotated relative to one another during pipe allocation and the pipe parts are non-rotatable. The displaceability is e.g. important for pipe parts that make high demands on the surface quality in the area of the initial and final geometries. When the laser beam pierces the initial and final geometry, part of the laser beam hits the pipe, mainly on the opposite pipe inner side and can cause discoloration of the pipe part at that location. If discoloration of the pipe part in the area of the initial and final geometries is not desired, the pipe part must not be displaced at all or only within a limited range. Nesting is based on unrolling of the three-dimensional pipe parts with the initial and final geometries into the two-dimensional plane. When the result of the test of step S22 is negative (N) and the pipe part is not or only incompletely nested, nesting of the pipe part with respect to the same pipe part and to all approved pipe parts of the order table is calculated in a third step S23, and the nesting results (X and A-offsets) are stored in a fourth step S24. The steps S23 and S24 are called preparatory calculation. Either after step S24 or when the result of the test of step S22 is positive (J), it is checked in a fifth step S25 whether a parts order has been created and approved in the order table for all pipe parts to be cut. When the result of the test of step S25 is negative (N), the first method stage is continued with step S21 and a further parts order for a pipe part is created and approved in the order table. When the result of the test of step S25 is positive (J) and a parts order for all pipe parts to be cut has been created and approved in the order table, the first process stage of the inventive method for optimizing the pipe allocation is terminated.

In a sixth step S26, the length of the pipe is measured and the measured value of the pipe length is transferred from the measuring means 85 to the control device 6 of the laser cutting machine 1 in a seventh step S27.

The second process stage of the method starts after the control device 6 has received the measured value of the pipe length in step S27. In an eighth step S28, a first pipe allocation variant is determined for which the sum of the lengths of the pipe parts (sum of pipe parts) and also the occupied pipe length are calculated by means of the nesting results from the preparatory calculation (steps S23 and S24) of the first process stage. The first pipe allocation variant is stored together with the sum of pipe parts and the occupied pipe length in a ninth step S29 as the desired, or "best pipe allocation." In a tenth step S30, it is checked whether the calculation of the pipe allocation variants was interrupted or terminated. When the result of the test of step S30 is positive (J) and the calculation of the pipe allocation variants is terminated, the method for optimizing the pipe allocation is terminated and the pipe allocation variant stored in step S29 as the desired, or "best pipe allocation" represents the result of the optimization method. When the result of the test of step S30 is negative (N) and the calculation of further pipe allocation variants is continued, in an eleventh step S31a further pipe allocation variant is determined for which the sum of pipe parts and the occupied pipe length are calculated by means of the nesting results of step S23. In a twelfth step S32, the sum of pipe parts of the further pipe allocation variant is compared with the sum of pipe parts of the "best pipe allocation" stored in step S29. When the result of the comparison of step S32 is smaller (N), i.e. the sum of pipe parts of the further pipe allocation variant is smaller than the sum of pipe parts of the "best pipe allocation," the further pipe allocation variant is dismissed and the inventive method is continued with step S30. When the result of the comparison of step S32 is, however, larger (J), i.e. the sum of pipe parts of the further pipe allocation variant is larger than the sum of pipe parts of the desired, or "best pipe allocation," the method is continued with step S29 and the further pipe allocation variant with the sum of pipe parts and the occupied pipe length is then stored as the "best pipe allocation." When the result of the comparison of step S32 is equal (G), i.e. the sum of pipe parts of the further pipe allocation variant corresponds to the sum of pipe parts of the "best pipe allocation," the occupied pipe length calculated in step S31 is compared in a thirteenth step S33 with the occupied pipe length of the "best pipe allocation." When the result of the comparison of step S33 is larger or equal (N), the pipe allocation variant determined in step S31 is dismissed and the method is continued with step S30. When the result of the comparison of step S33 is smaller (J), the method is continued with step S29 and the further pipe allocation variant with the sum of pipe parts and the occupied pipe length is then stored as the "best pipe allocation." In comparison with all other calculated pipe allocation variants, the "best pipe allocation" is e.g. characterized in that the sum of pipe parts is maximum and with identical sum of pipe parts, the occupied pipe length is minimum. When the pipe occupancies for several pipes are optimized (cross-pipe optimization method) it is also feasible not to use the maximum sum of pipe parts as a criterion for the "best pipe allocation" for a pipe when it is better to dispose a pipe part on another pipe.

In order to limit the time for preparatory calculation, the method for optimizing pipe allocation shown in FIG. 5 only uses approved parts orders of the order table, i.e. parts orders that have the status "approved." When there is sufficient time for preparatory calculation, nesting of a pipe part with respect to the blocked parts orders, i.e. parts orders with the status "blocked," can also be calculated in addition to the approved parts orders. It is also possible to calculate nesting of a pipe part with respect to the same pipe part and to other pipe parts already during importing the associated NC parts program into the program management 41. In this case, the required time and storage space can dramatically increase.

One parts order normally refers to one single pipe part that is unambiguously characterized by the associated NC parts program name. When pipe parts are to be produced in assemblies, the different pipe parts of the assembly can be combined into one order. In this case, the order comprises all NC parts programs of the individual pipe parts.

Parts orders for pipe parts need not be created in FMC software 39 but can be created outside of the FMC software 39 in a programming system. The order table is subsequently imported together with the NC parts programs into the FMC software 39. Nestings of the pipe parts with respect to each other can also be calculated in the programming system. The nesting results are then imported together with the order table into the FMC software 39.

FIGS. 6*a*-*d* show how step S23 of the preparatory calculation of the first process stage (FIG. 6*b*) and the steps S28 to S33 of the second process stage (FIGS. 6*c*, *d*) of the optimization method for pipe allocation are performed by means of example of a longer first pipe part 100 of a length $L_A$=55 cm and a shorter second pipe part 101 of the length $L_B$=45 cm. The pipe parts 100, 101 can each be produced in a quantity of 4, for example. For purposes of illustration, the measured pipe length is provided as 185 cm and the dead area of the clamping means 12 is provided as 10 cm.

FIG. 6*a* shows the pipe parts 100, 101 with their initial and final geometries. The first pipe part 100 has a 90° separating cut at the initial geometry 102 and a 45° separating cut at the final geometry 103. The second pipe part 101 has a 45° separating cut at the initial geometry 104 and a 63° separating cut at the final geometry 105. Since the final geometries 103, 105 of the two pipe parts 100, 101 represent an inclined section other than 90°, both pipe parts 100, 101 are not "cuttable." A pipe part is defined as cuttable when there is no contour cut in the dead area of the clamping means 12 and the final geometry of the pipe part represents a 90° separating cut and coincides with the pipe end.

FIG. 6*b* shows the four different arrangements 106 to 109 of the two pipe parts 110, 101 below one another: Arrangement 106 shows two longer pipe parts 100, arrangement 107 shows a longer 100 and a shorter pipe part 101, arrangement 108 shows a shorter 101 and a longer pipe part 100 and arrangement 109 shows two shorter pipe parts 101. The feasible displacements and/or rotations between the pipe parts 100, 101 are calculated within the scope of the preparatory calculation (steps S23 and S24). With a pipe diameter of 10 cm, the following example displacements are obtained: $X_{AA}$=0 cm, $X_{AB}$=10 cm, $X_{BA}$=0 cm and $X_{BB}$=5 cm. When a first pipe part 100 is disposed behind a first or second pipe part 100, 101 (arrangements 106, 108), displacement is not possible due to the 90° separating cut as initial geometry 102 ($X_{AA}$=$X_{BA}$=0 cm) and the occupied pipe part length of the pipe part 100 cannot be reduced. When a second pipe part 101 is disposed behind a first pipe part 100 (arrangement 107), the occupied pipe part length of the second pipe part 101 is reduced by $X_{AB}$=10 cm to 35 cm. When two shorter pipe parts 101 are disposed one behind the other (arrangement 109), the occupied pipe part length of the second pipe part 101 is reduced by $X_{BB}$=5 cm, i.e. to 40 cm.

Figure 6C:
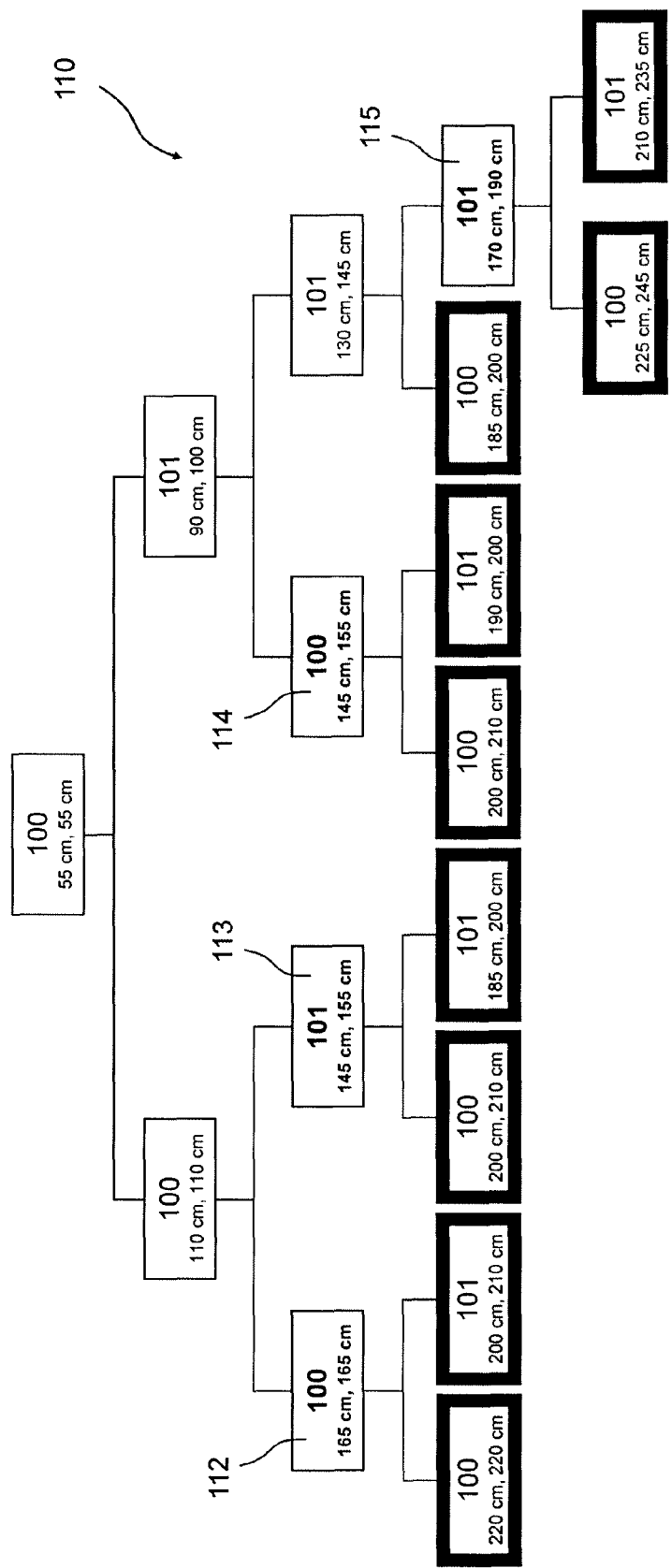
Figure 6D:
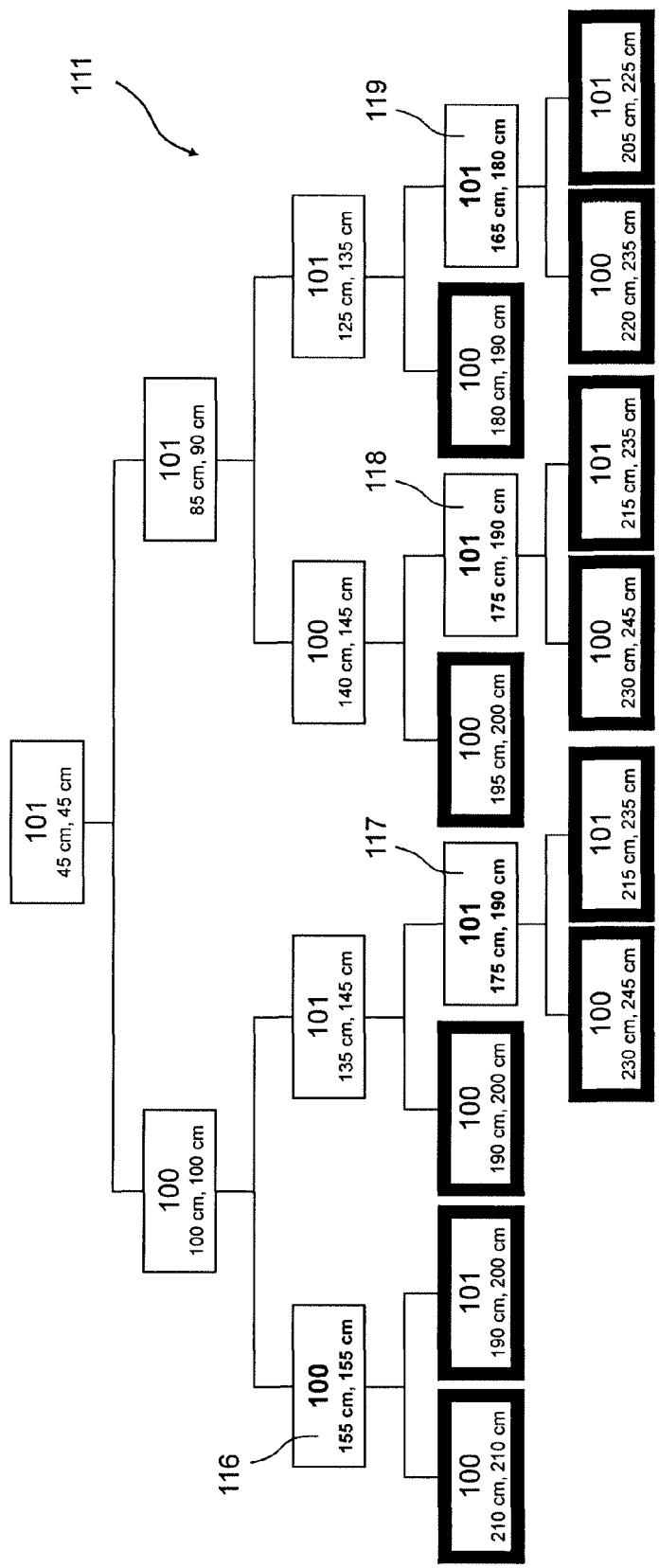

FIGS. 6*c*, *d* show how the pipe allocation variants for steps S28 and S31 are determined by means of tree structures 110, 111, wherein FIG. 6*c* shows the pipe allocation variants on the basis of the longer first pipe part 100 and FIG. 6*d* shows the pipe allocation variants on the basis of the shorter second pipe part 101. Pipe allocation variants, in which the occupied pipe length exceeds the measured overall length of the pipe are highlighted in grey, all pipe allocation variants highlighted in white represent one possible pipe allocation variant. The dead area of the clamping means 12 must be taken into consideration when checking whether a pipe allocation variant is possible. At first, it is checked whether the occupied pipe length of a pipe allocation variant is smaller or equal to the measured pipe length reduced by the dead area (reduced pipe length). When the result of the test is negative, and the last pipe part is a cuttable pipe part, it is checked whether the occupied pipe length is smaller or equal to the measured pipe length. A pipe part is cuttable when there is no contour cut in the dead area of the clamping means 12 and the final geometry of the pipe part represents a 90° separating cut and coincides with the pipe end. The property "cuttable" is determined by the programmer during creation of the NC parts program.

For determining a first pipe allocation variant for step S28, the longer pipe part 100 is arranged next to one another until the desired quantity of the pipe part 100 has been arranged on the pipe or the reduced pipe length of the pipe has been exceeded. With a reduced pipe length of 175 cm, it is possible to arrange three longer pipe parts 100 one after another, for the fourth pipe part 100 one obtains an occupied pipe length of 220 cm such that the reduced pipe length is exceeded. The fourth longer pipe part 100 is removed and replaced by a shorter pipe part 101. Since this pipe allocation variant also exceeds the reduced pipe length of the pipe and the pipe part 101 is not cuttable, the pipe allocation variant 112 with three longer pipe parts 100 is the first pipe allocation variant that is used in step S28. In order to determine further pipe allocation variants for step S31, the third longer pipe part 100 in the pipe allocation variant 113 is replaced by a shorter pipe part 101 which results in an occupied pipe length of 145 cm. When a first pipe part 100 or a second pipe part 101 is arranged therebehind, the occupied pipe lengths are 200 cm or 185 cm, i.e. more than the reduced pipe length of 175 cm. When all possible pipe allocation variants 112, 113 with two pipe parts 100 have been determined, the second longer pipe part 100 is replaced by a shorter pipe part 101. The tree structure 110 is subsequently supplemented by adding the pipe parts 100, 101 and one obtains further pipe allocation variants 114, 115. When all possible pipe allocation variants 112 to 115 that are based on the longer first pipe part 100 have been calculated in FIG. 6*c*, all pipe allocation variants 116 to 119 in FIG. 6*d* are determined on the basis of the shorter second pipe part 101. The tree structures 110, 111 enable that only the last possible pipe allocation variant of one branch is used as further pipe allocation variant in step S31 and must be compared with the best pipe allocation in step S32 (sum of pipe parts) and in step S33 (occupied pipe length), since the pipe allocation variants of the branch disposed above have a smaller sum of pipe parts.

The best pipe allocation for the example of FIGS. 6*a*-*d* is the pipe allocation variant 115 consisting of a longer first pipe part 100 and three shorter second pipe parts 101 with a sum of pipe parts of 190 cm and an occupied pipe length of 170 cm. The further pipe allocation variants consisting of a longer pipe part 100 and three shorter pipe parts 101, wherein the longer pipe part 100 is disposed at the second, third or fourth position, have the same sum of pipe parts of 190 cm. The pipe allocation variants in which the longer first pipe part 100 is disposed at a second position (pipe allocation variant 117) or third position (pipe allocation variant 118), have an occupied pipe length of 175 cm each and are therefore larger than the occupied pipe length of the best pipe allocation. The "best pipe allocation" is characterized in that the sum of pipe parts is maximum and, with the same sum of pipe parts, the occupied pipe length is minimum. The pipe allocation variant in which the longer first pipe part 100 is disposed at a fourth position does not represent a feasible pipe allocation variant, since the occupied pipe length of 180 cm is larger than the reduced pipe length of 175 cm and the last pipe part 100 is not cuttable.

A number of embodiments of the invention have been described. Nevertheless, it will be understood that various modifications may be made without departing from the spirit and scope of the invention. Accordingly, other embodiments are within the scope of the following claims.

What is claimed is:

1. A method for allocation of a pipe with several pipe parts to be cut using a laser cutting machine, wherein the pipe parts to be cut are selected from an order table, the method comprising:
   prior to cutting any pipe parts from the pipe:
      calculating a nesting of a pipe part relative to another pipe part of the several pipe parts, each nesting pipe part comprising an inclined end having an angle other than 90°,
      measuring, after calculating the nesting, a length of the pipe,
      calculating a plurality of pipe part allocation variants for the pipe with the pipe parts to be cut based on the calculated nesting and the measured pipe length of the pipe,
      calculating a sum of pipe parts for each of the plurality of calculated pipe part allocation variants;
      identifying a subset of calculated pipe part allocation variants as having a same maximum sum of pipe parts;
      calculating an occupied pipe length for each of the subset of calculated pipe part allocation variants; and
      selecting one of the plurality of calculated pipe part allocation variants as a desired pipe part allocation, the desired pipe part allocation having the smallest occupied pipe length of the subset of calculated pipe part allocation variants; and
   cutting pipe parts from the pipe based on the desired pipe part allocation.

2. The method according to claim 1, further comprising calculating a sum of pipe parts for each of the plurality of calculated pipe part allocation variants, wherein a calculated pipe part allocation variant having the largest sum of pipe parts is selected as the desired pipe part allocation.

3. The method of claim 1, further comprising calculating nesting for each pipe part of the order table based on an approved parts order.

4. The method of claim 1, further comprising calculating nesting based on an approved parts order.

5. The method according to claim 1, further comprising calculating nesting with respect to all different pipe parts of the order table based on a blocked parts order.

6. The method according to claim 1, further comprising transferring the measured pipe length to a control device of the laser cutting machine, wherein calculating the pipe part allocation variants occurs upon receipt of the measured pipe length at the control device.

7. The method according to claim 1, wherein calculating pipe part allocation variants is terminated after a preset time.

8. The method according to claim 1, further comprising dispatching a parts order for a pipe part into the order table, wherein nesting of the pipe part is calculated in response to dispatching.

9. The method according to claim 1, further comprising receiving approval of a parts order for a pipe part, wherein nesting of the pipe part is calculated in response to receiving approval.

10. The method according to claim 1, wherein calculating nesting of a pipe part is initiated by a machine operator.

11. The method according to claim 1, wherein calculated nestings of a pipe part are deleted as soon as an associated NC parts program of the pipe part has been deleted from a program management device.

12. The method according to claim 1, wherein calculated nestings of a pipe part are deleted as soon as an associated parts order of the pipe part has been deleted in the order.

13. A non-transitory computer program product for allocation of a pipe with several pipe parts to be cut using a laser cutting machine, the program product being executable on a data processing system to perform operations comprising
   prior to cutting any pipe parts from the pipe:
      calculating a nesting of a pipe part relative to another pipe part of the several pipe parts, each nesting pipe part comprising an inclined end having an angle other than 90°,
      measuring, after calculating the nesting, a length of the pipe,
      calculating a plurality of pipe part allocation variants for the pipe with the pipe parts to be cut based on the calculated nesting and the measured pipe length of the pipe,
      calculating a sum of pipe parts for each of the plurality of calculated pipe part allocation variants;
      identifying a subset of calculated pipe part allocation variants as having a same maximum sum of pipe parts;
      calculating an occupied pipe length for each of the subset of calculated pipe part allocation variants; and
      selecting one of the plurality of calculated pipe part allocation variants as a desired pipe part allocation, the desired pipe part allocation having the smallest occupied pipe length of the subset of calculated pipe part allocation variants; and
   initiating cutting pipe parts from the pipe based on the desired pipe part allocation.

14. The computer program product according to claim 13, wherein the operations further comprise calculating a sum of pipe parts for each of the plurality of calculated pipe part allocation variants, wherein a calculated pipe part allocation variant having the largest sum of pipe parts is selected as the desired pipe part allocation.

15. The computer program product of claim 13, wherein the operations further comprise one of:
   calculating nesting for each pipe part of the order table based on an approved parts order;
   calculating nesting based on an approved parts order; and
   calculating nesting with respect to all different pipe parts of the order table based on a blocked parts order.

16. The computer program product of claim 13, wherein the operations further comprise one of:
   dispatching a parts order for a pipe part into the order table, wherein nesting of the pipe part is calculated in response to dispatching;
   receiving approval of a parts order for a pipe part, wherein nesting of the pipe part is calculated in response to receiving approval; and
   calculating nesting of a pipe part when initiated by a machine operator.

17. A method for allocation of a pipe with several pipe parts to be cut using a laser cutting machine, wherein the pipe parts to be cut are selected from an order table, the method comprising:
   prior to cutting any pipe parts from the pipe:
      calculating a nesting of a pipe part relative to another pipe part of the several pipe parts, each nesting pipe part comprising an inclined end having an angle other than 90°,
      measuring, after calculating the nesting, a length of the pipe, calculating a plurality of pipe part allocation variants for the pipe with the pipe parts to be cut based on the calculated nesting and the measured pipe length of the pipe, wherein calculating the plurality of pipe part allocation variants is terminated as soon as the pipe has been disposed in a transfer position and has been transferred to a supply device of the laser cutting machine, and selecting one of the plurality of calculated pipe part allocation variants as a desired pipe part allocation; and cutting pipe parts from the pipe based on the desired pipe part allocation.

18. A method for allocation of a pipe with several pipe parts to be cut using a laser cutting machine, wherein the pipe parts to be cut are selected from an order table, the method comprising:

prior to cutting any pipe parts from the pipe:
calculating a nesting of a pipe part relative to another pipe part of the several pipe parts, each nesting pipe part comprising an inclined end having an angle other than 90°,
measuring, after calculating the nesting, a length of the pipe,
calculating a plurality of pipe part allocation variants for the pipe with the pipe parts to be cut based on the calculated nesting and the measured pipe length of the pipe, wherein calculating the plurality of pipe part allocation variants is terminated as soon as the pipe is disposed in a processing position, and
selecting one of the plurality of calculated pipe part allocation variants as a desired pipe part allocation; and
cutting pipe parts from the pipe based on the desired pipe part allocation.

* * * * *